E. PFEIFER.
MOLD.
APPLICATION FILED SEPT. 23, 1911.
1,024,357.
Patented Apr. 23, 1912.
2 SHEETS—SHEET 1.
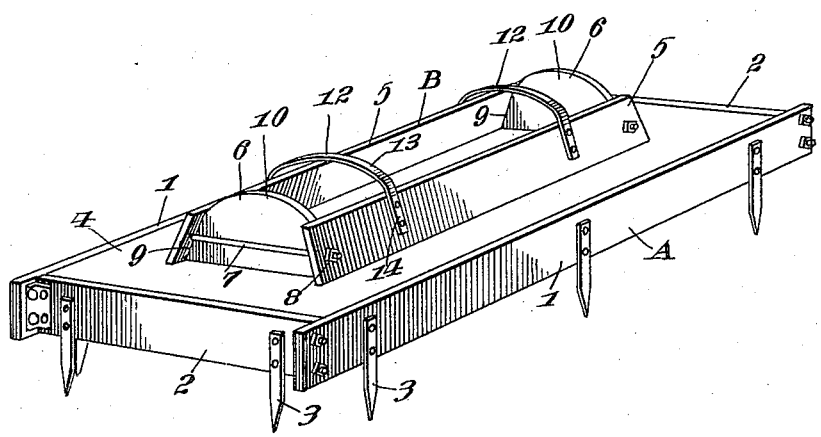
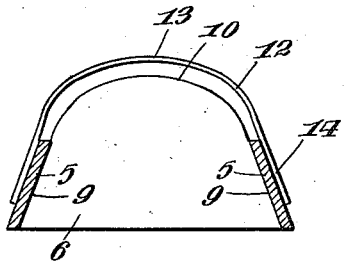
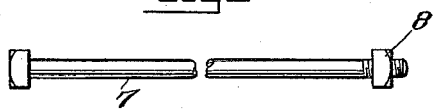
Inventor
Emil Pfeifer
Witnesses
By Victor J. Evans
Attorney

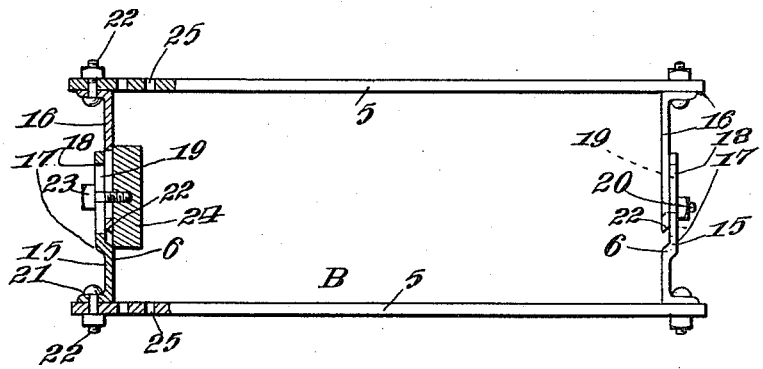
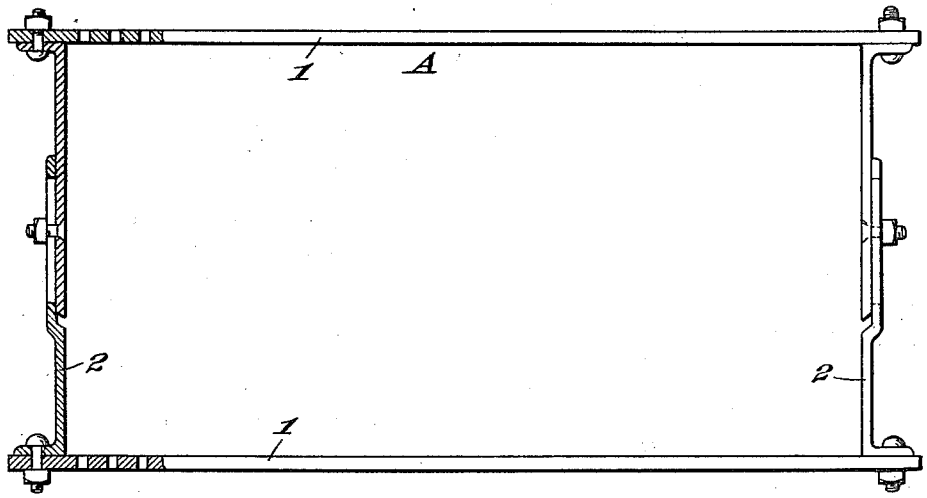

UNITED STATES PATENT OFFICE.

EMIL PFEIFER, OF MASCOUTAH, ILLINOIS.

MOLD.

1,024,357.

Specification of Letters Patent.

Patented Apr. 23, 1912.

Application filed September 23, 1911. Serial No. 650,873.

*To all whom it may concern:*

Be it known that I, EMIL PFEIFER, a citizen of the United States, residing at Mascoutah, in the county of St. Clair and State of Illinois, have invented new and useful Improvements in Molds, of which the following is a specification.

This invention relates to improvements in molds, and more particularly to molds for forming combined grave mounds and borders.

The invention aims to provide a mold of this character which shall be simple in construction, cheap to manufacture, and efficient in operation.

To this end the invention contemplates the provision of an inner mold and an outer mold, the inner mold resting upon the material within the outer mold and serving to form a grave mound, the outer mold being designed to form the border.

With the above and other objects in view, which shall appear as the description progresses, the invention consists in the construction, combination, and arrangement of parts hereinafter fully described, claimed, and illustrated in the accompanying drawings, wherein;

Figure 1 is a perspective view of a mold constructed in accordance with the present invention. Fig. 2 is a transverse section through the inner mold. Fig. 3 is a detail of one of the brace rods of the inner mold. Fig. 4 is a top plan view of a modified form of the inner mold, partly in section, and Fig. 5 is a similar view of a modified form of outer mold.

Referring more particularly to the accompanying drawings, in which like reference characters designate similar parts, A designates the outer mold and B the inner mold. The outer mold A is constructed of any material suitable for the purpose, and comprises longitudinal side bars 1, and transverse end bars 2, the end bars being bolted or otherwise secured to the side bars 1 and positioned adjacent the ends thereof thereby forming a substantially rectangular mold. Secured to the bars 1 and 2 and depending therefrom, are a plurality of spikes or fastening devices 3, designed to be driven into the ground for securing the mold A in position.

The parts of the mold A being positioned as described, the same is filled with a body of cement 4, or other suitable plastic material, to a point adjacent the upper surface thereof whereby to form the border or grave mound. Mounted upon this plastic mass 4 and centrally of the mold A is the mound mold B comprising the longitudinal side bars 5 and transverse end bars 6 interconnecting the side bars 5 and bolted or otherwise fastened thereto adjacent the ends of the said bars 5. Exteriorly of the bars 6, the longitudinal members 5 are provided with alining openings through which pass headed stay rods 7 having one end screw threaded to receive the retaining nuts 8. The opposite side edges of the transverse bars 6 are beveled in a downward direction, as shown at 9, and have their upper surfaces curved or rounded, as illustrated at 10 in the drawing, which latter merge into the upper surfaces of the longitudinal side members 5.

The side members 5 being fastened to the beveled sides 9 of the transverse members 6 have a downward inclination whereby the longitudinal sides of the mound are similarly formed, the upper surface of the mound being rounded or curved and merging into the inclined sides thereof by means of a trimming tool 11, which latter corresponds to the curvature of the surface 10 of the members 6 and passes over the upper surface of the mold B after the plastic material has been deposited therein. Intermediate their ends the longitudinal bars 5 of the inner mold B are interconnected and prevented from expanding by means of brace elements 12. The brace elements 12 are identically constructed, and each comprises an arcuate intermediate portion 13 terminating at its opposite ends in angular clamping bars 14 corresponding to the inclination of the longitudinal bars 5 and engaging the outer sides thereof, whereby the same are securely braced and held against expansion incident to the settling of the plastic mass within the mold B.

In the modification illustrated in Figs. 4 and 5, the end bars 6 of the mold B are shown as comprising two relatively movable sections 15 and 16. The sections 15 intermediate their ends are provided with lateral offset portions 17 which latter terminate in adjusting members 18 formed with elongated slots 19 designed to receive a screw threaded securing pin 20 carried by one end of the sections 16 and slidably disposed within the slot 19, the pin 20 being provided with nuts whereby the sections may be secured against movement. The sections 15 and 16 are flanged at their outer ends as shown at 21, the flanges being provided with bolt openings adapted to receive the bolts 22, and the section 16 has its inner extremity beveled at 22, the beveled portion 22 being designed to contact with the offset portion 17 of the section 15, as illustrated in Fig. 4. Upon the separation of these two sections, in the lateral adjustment of the mold, a block may be inserted between the portions 17 and 22 so as to present an unbroken surface to the plastic material within the mold. One of the sections 16 is provided with an elongated slot corresponding to and alining with the slot 19 in its companion member 15 receiving a combined adjusting and positioning screw 23 the inner end of which threadedly engages a block 24 disposed within the mold B and adapted to be positioned intermediate the side members 5 thereof on one of the end members 6. The purpose of this block 24 being to provide a slot or cut-out portion within the mound so that a foot stone may be inserted therein.

The side bars 5 of the inner mold B illustrated in Fig. 4, are provided with a plurality of longitudinally arranged bolt openings 25 adapted to receive the bolts 22 whereby the length of the mold may be varied as well as the width thereof.

The outer mold A illustrated in Fig. 5 has its side and end bars 1 and 2 constructed identically to the bars 5 and 6 of the inner mold B described in connection with Fig. 4, except that this outer mold is not provided with a block for a foot stone, therefore a further description of this figure is deemed unnecessary.

From the foregoing description taken in connection with the accompanying drawings, it will be seen that I have provided a simple and inexpensive mold, and one which is particularly adapted for use in forming combined grave borders and mounds.

Having thus described my invention what I claim and desire to secure by Letters-Patent, is:

A mold including side bars and end bars, means for moving said end bars longitudinally of the side bars so as to vary the length of the mold, said end bars including relatively movable sections provided with alining elongated slots, a combined positioning and adjusting screw adapted to engage the slots of one of said end bars to hold the sections in adjusted position, and a block adapted to be engaged by the said screw and adapted to be positioned within the mold to form a slot or cut out portion in the material being molded, means adapted to engage the slots in the sections of the other end bar, the sections of said end bars permitting lateral adjustment of the said side bars.

In testimony whereof I affix my signature in presence of two witnesses.

EMIL PFEIFER.

Witnesses:
 E. R. HAGIST,
 GUST. J. SCHEVER.

---

Copies of this patent may be obtained for five cents each, by addressing the "Commissioner of Patents, Washington, D. C."